(No Model.)
W. S. CARR, Dec'd.
C. E. Carr and G. D. Scott, Executors.
SELF CLOSING FAUCET.
No. 245,132. Patented Aug. 2, 1881.
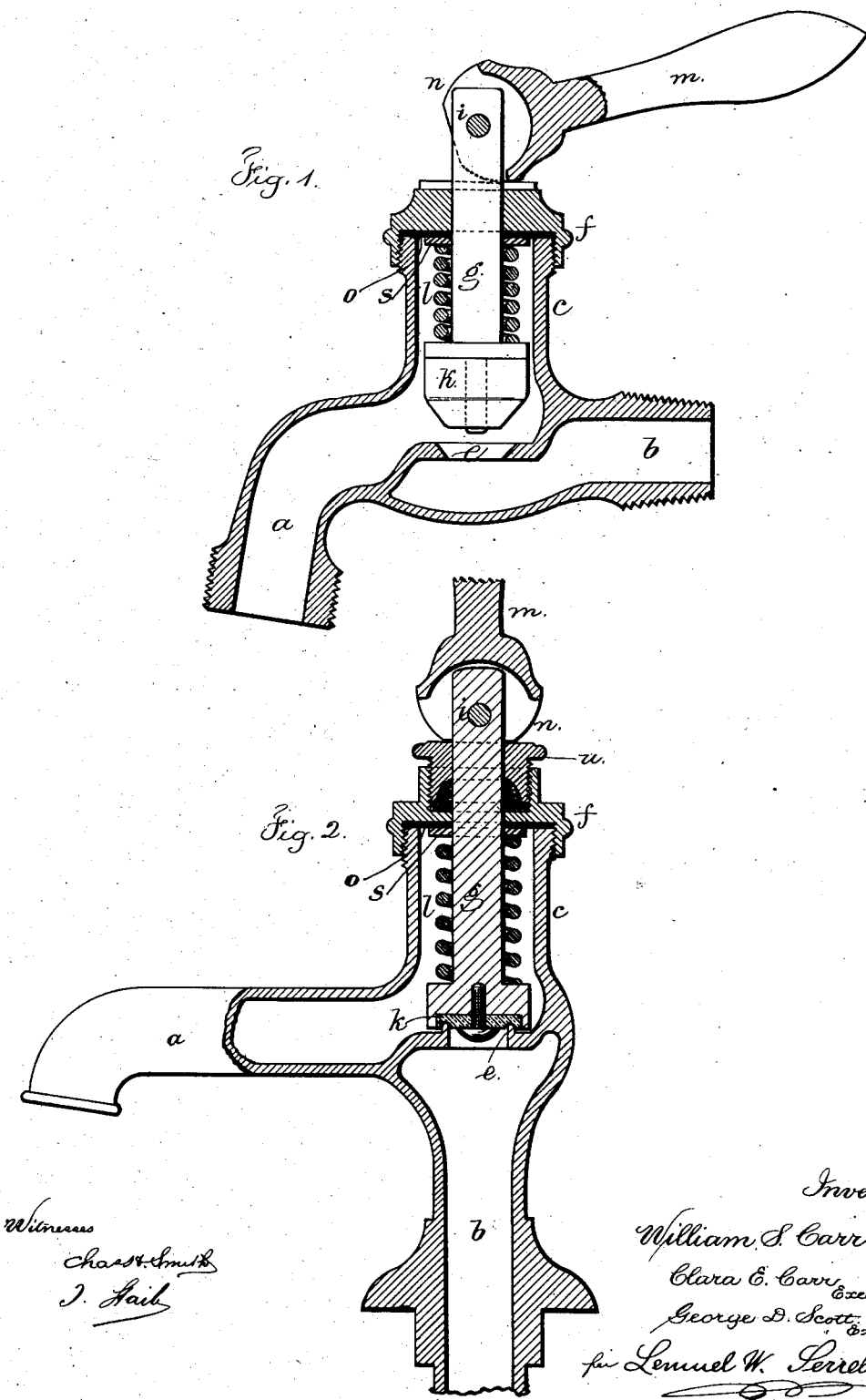

UNITED STATES PATENT OFFICE.

CLARA E. CARR AND GEORGE D. SCOTT, OF NEW YORK, N. Y., EXECUTORS OF WILLIAM S. CARR, DECEASED.

SELF-CLOSING FAUCET.

SPECIFICATION forming part of Letters Patent No. 245,132, dated August 2, 1881.

Application filed January 19, 1881. (No model.)

*To all whom it may concern:*

Be it known that WILLIAM S. CARR, of the city and State of New York, now deceased, did invent an Improvement in Self-Closing Faucets, of which the following is a specification.

Self-closing faucets have been made with a rubber plug forming the valve, and a crank or cam action has been availed of for opening the valve, and a spring has been used in some faucets for closing the valve against the action of the water.

In the present invention a spring is used for pressing the valve to its seat, and also for making the packing around the stem tight where the stem passes through the cap. A lever is hinged to the upper end of the stem, and is provided with cam-faces acting against the top of the cap.

The invention relates to the combinations of devices hereinafter set forth.

In the drawings, Figure 1 is a vertical section of the valve or faucet, with a convex plug to enter a recessed seat; and Fig. 2 is a similar view, with flat valve acting against a raised seat.

The cock or faucet is made with a bib or delivery-pipe, $a$, and a supply-pipe, $b$, and $c$ is the barrel for the valve. These parts may be of any desired size or shape, and the supply-pipe $b$ may pass in horizontally, as shown in Fig. 1, or it may be vertically beneath the valve-seat $e$, as seen in Fig. 2.

There is a screw-cap, $f$, at the upper end of the cylinder $c$, and through this the stem $g$ of the valve passes.

$k$ is the valve at the lower end of the stem. Said valve may be adapted to pass into the concave valve-seat $e$, (shown in Fig. 1,) in which case the valve will preferably be a tapering or rounding rubber plug; or the valve-seat $e$ may be raised as an annular bearing, as shown in Fig. 2, and the valve be a disk of yielding material in a recess in the face of the valve-body to rest upon the raised seat.

The wire helix $l$ between the valve and the cap $f$ serves to close the valve against the pressure, and the lever or handle $m$, having cam-shaped faces $n$ at its lower end. The stem $g$, passing between such faces and being hinged by the cross-pin $i$, serves to raise the stem and hold the cock open when the handle is depressed. Usually the shape of the cam-faces $n$ will be such that the valve will close as soon as the handle is liberated; but such cam-faces may be flattened at one side in such a manner that the valve will be held open when the handle is depressed at one side to its extreme point.

There is an elastic washer, $o$, between the screw-cap and the upper end of the cylinder $c$, and a rigid or metal washer, $s$, intervenes between the spring and the elastic washer $o$ to cause a uniform bearing and pressure of the spring upon the washer to render the same tight around the stem of the valve, and to prevent injury to the washer $o$ by the end of the spring.

In the cap $f$ there is a recess for receiving packing of fibrous material, and into this recess there is screwed the follower $u$ to retain the packing and compress the same upon the stem of the valve to make the parts water-tight. This improvement renders the valve very durable, and there is nothing but what can easily be replaced in case of leakage or wear.

A faucet with a valve pressed to a seat by a spring of india-rubber intervening between the valve and the cap is not claimed.

Helical springs have been used between the cap and the valve, and a link has been provided between the valve-stem and a swinging cam-lever. This, however, could not be made water-tight at the opening in the cap for the link. The stem has also been provided with a T-head, acted upon by a cam-lever pivoted to the cap.

What is claimed as the invention of the said WILLIAM S. CARR is—

1. The combination, in a self-closing faucet, of a valve, valve-stem, and lever pivoted to the valve-stem, cam-faces upon the lever at each side of the valve-stem, a screw-cap through which the valve-stem passes, a helical metal spring to close the valve, and a leather and metal washer between the spring and the under side of the screw-cap, substantially as set forth.

2. The combination, in a self-closing faucet, of the inlet and delivery pipes, the valve cylinder and seat, the cap to the cylinder, and its packing around the valve-stem, the valve and its stem and helical spring, and the cam-lever pivoted to the stem and acting against the outside of the cap, substantially as set forth.

Signed by us this 21st day of December, A. D. 1880.

CLARA E. CARR,
GEORGE D. SCOTT,
*Executors.*

Witnesses:
WILLIAM G. MOTT,
GEO. T. PINCKNEY.